US012800334B2

(12) United States Patent
Witte

(10) Patent No.: US 12,800,334 B2
(45) Date of Patent: Nov. 17, 2026

(54) METHOD AND PROCESSING SYSTEM FOR PROCESSING PROBE DATA FOR PERFORMANCE OF AT LEAST ONE LANE LEVEL TRAFFIC-BASED FUNCTION

(71) Applicant: TomTom Traffic B.V., Amsterdam (NL)

(72) Inventor: Nikolaus Witte, Berlin (DE)

(73) Assignee: TOMTOM TRAFFIC B.V., Amsterdam (NL)

( * ) Notice: Subject to any disclaimer, the term of this patent is extended or adjusted under 35 U.S.C. 154(b) by 31 days.

(21) Appl. No.: 18/983,126

(22) Filed: Dec. 16, 2024

(65) Prior Publication Data

US 2025/0207933 A1 Jun. 26, 2025

(30) Foreign Application Priority Data

Dec. 21, 2023 (EP) .................................... 23219336

(51) Int. Cl.
*G01C 21/36* (2006.01)

(52) U.S. Cl.
CPC ................................ *G01C 21/3658* (2013.01)

(58) Field of Classification Search
CPC ........................... G02C 21/3658; G02C 21/30; G02C 21/3492; G02C 21/3841; G01S 19/40; G01S 19/42; G08G 1/0129; G08G 1/0133; G08G 1/0141; G08G 1/052; G08G 1/0112
See application file for complete search history.

(56) References Cited

U.S. PATENT DOCUMENTS 5,539,645 A * 7/1996 Mandhyan ........... G08G 1/0104 701/119
5,703,778 A * 12/1997 Takahashi ................ G08G 1/08 340/913
5,801,943 A * 9/1998 Nasburg ........... G08G 1/096775 340/910
5,979,581 A * 11/1999 Ravani ...................... B60T 7/16 180/168
6,011,515 A * 1/2000 Radcliffe .................. G01P 3/64 340/936
6,047,234 A * 4/2000 Cherveny .......... G01C 21/3841 340/988
6,150,961 A * 11/2000 Alewine .................. G08G 1/01 701/119
6,385,539 B1 * 5/2002 Wilson ................. G08G 1/0129 340/905
11,501,637 B2 * 11/2022 Xu ......................... G01C 21/32
11,657,706 B2 * 5/2023 Fowe ................... G08G 1/0141 701/119

(Continued)

OTHER PUBLICATIONS

Extended EP Search Report for EP App. No. 23219336.7 dated May 31, 2024.

*Primary Examiner* — Mussa A Shaawat
(74) *Attorney, Agent, or Firm* — Buckley, Maschoff & Talwalkar LLC

(57) ABSTRACT

A processing system is operative to process probe data for performance of at least one lane level traffic-based function. Processing the probe data comprises obtaining probe speeds for the probes on a segment of a navigable network and determining one or more lane-specific speed characteristics based at least on a clustering of the probe speeds responsive to verifying that the probe speeds are assignable to clusters of probe speeds.

20 Claims, 8 Drawing Sheets

(56) References Cited

U.S. PATENT DOCUMENTS

2007/0032946 A1* 2/2007 Goto ...................... G09B 29/00 701/93
2009/0140887 A1* 6/2009 Breed ................ G01C 21/1656 701/116
2013/0030690 A1* 1/2013 Witmer .................. G01C 21/30 701/409
2013/0282264 A1* 10/2013 Bastiaensen ......... G08G 1/0145 701/119
2013/0311076 A1* 11/2013 Mieth .................. G08G 1/0129 701/119
2015/0153183 A1* 6/2015 Kadous .............. G01C 21/3815 701/532
2015/0161886 A1* 6/2015 Kesting .................... G08G 1/01 701/117
2016/0069695 A1* 3/2016 Broadbent ......... G01C 21/3667 701/411
2016/0102986 A1* 4/2016 Ma ..................... G01C 21/3819 702/5
2016/0334241 A1* 11/2016 Kesting ................ G08G 1/0133
2017/0076598 A1* 3/2017 Scofield ................ B60W 40/04
2018/0158325 A1* 6/2018 Bernhardt ............ G08G 1/0129
2018/0215380 A1 8/2018 Devi
2020/0234585 A1* 7/2020 Bai ...................... G05D 1/0088
2022/0013014 A1* 1/2022 Xu ..................... G01C 21/3691
2022/0205799 A1* 6/2022 Radakovic ............. G01C 21/30
2022/0207995 A1* 6/2022 Fowe ...................... G06F 16/29
2023/0019719 A1* 1/2023 Mo .................... G01C 21/3815
2023/0204376 A1* 6/2023 Fowe ..................... G08G 1/052
2023/0204381 A1* 6/2023 Nutakki ............. G01C 21/3867 701/409
2023/0204382 A1* 6/2023 Nutakki ............. G01C 21/3841 701/409
2023/0206752 A1* 6/2023 Rajagopal ............ G08G 1/0112 701/11
2023/0324195 A1* 10/2023 Fowe ................. G01C 21/3492 701/118
2023/0408276 A1* 12/2023 Beaurepaire ....... G05B 13/0265
2024/0200977 A1* 6/2024 Kokubo ................... G08G 1/01

* cited by examiner

METHOD AND PROCESSING SYSTEM FOR PROCESSING PROBE DATA FOR PERFORMANCE OF AT LEAST ONE LANE LEVEL TRAFFIC-BASED FUNCTION

TECHNICAL FIELD

Embodiments of the invention relate to techniques associated with processing probe data for performing a lane level traffic-based function. Embodiments of the invention relate in particular to techniques useful in processing probe data to determine lane-specific data comprising a lane-specific speed.

BACKGROUND

Routing, navigation, driver assistance, and automated driving are widely used. These techniques use electronic map data in combination with a global navigation satellite system (GNSS)-based vehicle location and/or other sensor data to provide accurate guidance, driver assistance, and/or enable autonomous driving.

More recently, there is a trend to perform routing, navigation, driver assistance and/or other function at a lane level, instead of just at the road level. This trend is driven by several factors that aim to enhance safety, efficiency, and precision in vehicle operation. Examples for such factors include:

- Improved Precision: Roads often consist of multiple lanes (for at least one driving direction), each with its own specific characteristics, such as different speed limits or dedicated turn lanes. By considering the lane-level information, routing and navigation systems can provide more accurate instructions and guidance, ensuring that drivers take the appropriate lane for their intended maneuvers.
- Enhanced Safety: Lane-level routing and driver assistance systems enable better lane-keeping and lane-changing functionalities. By understanding the lane-specific information, these systems can help drivers maintain their position within the lanes, make safe lane changes, and avoid potential collisions.
- Efficient Route Planning: Lane-level routing helps optimize route planning by taking into account lane-specific factors, such as high-occupancy vehicle (HOV) lanes, toll lanes, and/or turn-dependent jams. This ensures that drivers are directed to the appropriate lane for efficient routing.
- Advanced Driver Assistance Systems (ADAS): Lane-level information is also important for ADAS techniques, such as lane-keeping assist or adaptive cruise control. At least some ADAS systems rely on accurate lane detection to provide alerts or automatic control, e.g., for lane departure prevention or maintaining safe distances from vehicles in adjacent lanes, and/or lane changes (e.g., comfortable lane changes over time).
- Autonomous vehicle functions: Lane-level data is also important for autonomous vehicles to navigate accurately and safely. By utilizing lane-level data, automated driving systems can precisely analyze and interpret lane markings, signs, and other lane-specific information to make informed decisions and ensure safe and reliable operation.

To take advantage of functions that are performed on lane level, lane specific data must be available and probes must be assignable to lanes (a process also referred to as lane assignment in the art). Lane-specific speeds are one example of lane-specific data that is particularly relevant for performing lane level traffic-based functions. A further example includes verifying absence of probe on a lane for lane-closure (with, e.g., lane closure being performed conditionally dependent on the verification that no probe is located on the lane).

Probe lane assignment based on GNSS-based position data can result in incorrect lane assignment due to the inherent position uncertainty of GNSS-based positions. As a result, reliability of lane-specific speeds obtained from a probe lane assignment based on GNSS-based position data can also be adversely affected by the uncertainty of GNSS-based positions. Additional root causes that can adversely affect a probe lane assignment based on GNSS-based position data and, thus, lane-specific speeds determined based thereon include mismatches between the real-world lane geometry and electronic map data (which may be caused by temporary closure, construction work, or maintenance work) and/or GNSS signal distortions (which may be caused by reflections or atmospheric effects).

In view of the above, there is a need for improved methods, devices, and systems useful in association with lane level-based functions, such as lane-level based functions of routing, navigation, driver assistance, ADAS, and/or autonomous driving.

SUMMARY

It is an object of embodiments of the invention to provide methods, systems, and/or machine-readable instruction code that provide enhanced techniques useful in association with a lane level traffic-based function. It is in particular an object of embodiments to provide methods, systems, and/or machine-readable instruction code operative to perform or assist in performance of a lane level traffic-based function, while providing alternative techniques of establishing one or several lane-specific speed characteristics that are less prone to be affected by inaccuracies in a lane assignment using position data obtained with a global navigation satellite system.

According to embodiments of the invention, a method, a processing system, a system, and machine-readable instruction code as recited in the independent claims are provided. The dependent claims define preferred and advantageous embodiments.

According to an aspect of the invention, a method of processing probe data for performance of at least one lane level traffic-based function is provided. The method comprises receiving, by a processing system, the probe data from a plurality of probes travelling on a navigable network, wherein the probe data comprises global navigation satellite system (GNSS)-based position data. The method comprises processing, by the processing system, the probe data. Processing the probe data comprises determining, for a segment of the navigable network identified based at least on the GNSS-based position data, lane-specific data based at least on the probe data from probes on the segment, comprising: obtaining probe speeds for the probes on the segment based on the probe data from the probes on the segment; verifying that the probe speeds are assignable to clusters of probe speeds; and determining one or more lane-specific speed characteristics based at least on a clustering of the probe speeds responsive to verifying that the probe speeds are assignable to clusters of probe speeds. Processing the probe data comprises providing or using the lane-specific data for the performance of the at least one lane level traffic-based function.

Various effects and advantages are associated with the method. By determining one or more lane-specific speed characteristics based at least on a clustering of the probe speeds, the method takes advantage of the fact that, while GNSS positions are associated with an uncertainty that is on a same order of magnitude as a lane width, speeds can be determined more reliably. The method, thus, provides a technique of determining lane-specific speed characteristics that does not need to rely on GNSS position-based probe lane assignment. By determining the one or more lane-specific speed characteristics responsive to verifying that the probe speeds are assignable to clusters of probe speeds, the processing method uses a built-in check which reduces the risk of operating based on unreliable lane-specific speed characteristics. Mitigating the risk of potential inaccuracies in determining lane-specific speed characteristics enhances the reliability and safety of lane level traffic-based functions, such as routing, navigation, driver assistance, ADAS functions, and/or autonomous driving functions that are dependent on traffic at the lane level.

The one or more lane-specific speed characteristics may be determined independently of lane count information of electronic map data.

Thereby, the determination of the one or more lane-specific speed characteristics is robust against potential inaccuracies of the electronic map data (as may be caused by temporary lane closure or lane swing) and/or allows the one or more lane-specific speed characteristics to be determined even in cases in which the electronic map data does not provide information on a lane count (i.e., a number of lanes) for the segment.

The clustering may be performed independently of the lane count information.

Thereby, the lane count is an inherent result of the clustering of probe speeds on the segment. This lane count, obtained by the clustering of probe speeds, may be used for performance of the at least one lane level traffic-based function. The determination of the one or more lane-specific speed characteristics is robust against potential inaccuracies of the electronic map data (as may be caused by temporary lane closure or lane swing) and/or allows the one or more lane-specific speed characteristics to be determined even in cases in which the electronic map data does not provide information on a lane count (i.e., a number of lanes) for the segment.

The one or more lane-specific speed characteristics may be determined independently of a lateral offset of the probes on the segment in a direction transverse to an extension of the segment.

Thereby, the determination of the one or more lane-specific speed characteristics is performed in a manner which is not adversely affected by the uncertainty inherent in a GNSS-based position.

Determining the one or more lane-specific speed characteristics may comprise determining a number of the clusters of probe speeds in the clustering.

Thereby, the clustering may be implemented in a manner which uses the number of clusters of probe speeds as a parameter of the clustering. The determined number of cluster may be indicative of a lane count, obtained by the clustering of probe speeds, which may be used for performance of the at least one lane level traffic-based function.

Determining the one or more lane-specific speed characteristics may comprise determining a mean, median or average speed for a cluster of the clusters of probe speeds, in particular for each of the clusters of probe speeds.

Thereby, a lane-specific speed is obtained, which is particularly useful for lane level traffic-based route search, route guidance, and cruising control, without being limited thereto.

The lane level traffic-based may be performed based at least on lane-level speeds for several lanes, wherein the lane-level speeds are based on the determined mean, median or average speed.

Thereby, lane-specific speeds based on clustering of probe speeds are utilized to perform the at least one lane level traffic-based function.

Alternatively or additionally, determining the one or more lane-specific speed characteristics may comprise determining an uncertainty measure for a cluster of the clusters of probe speeds, in particular for each of the clusters of probe speeds. The uncertainty measure may comprise a variance or another measure quantifying the deviation of probe speeds within a same cluster from each other.

Thereby, a lane-specific speed uncertainty measure is obtained, which is particularly useful for lane level traffic-based functions such as preferring lanes with lower speed uncertainty over lanes with higher speed uncertainty.

The lane level traffic-based may be performed based at least on lane-level speed variances for several lanes, wherein the lane-level speed variances are based on the determined uncertainty measure.

Thereby, lane-specific speeds variances determined based on clustering of probe speeds are utilized to perform the at least one lane level traffic-based function.

Providing or using the lane-specific data may comprise correcting an error in an GNSS position-based lane assignment based at least on the one or more lane-specific speed characteristics.

Thereby, information obtained in the probe speed clustering can be used for mitigating potential errors in GNSS-position based probe lane assignment.

Correcting an error in the GNSS position-based lane assignment may comprise determining whether a probe speed obtained from the probe data for a probe is clustered into a cluster that is consistent with a lane to which the probe is assigned in the GNSS-position based probe lane assignment. Responsive to detection of an inconsistency, the processing system may mark the GNSS position-based lane assignment as unreliable and/or may override the GNSS position-based lane assignment with a probe speed-based lane assignment.

Thereby, information obtained in the probe speed clustering can be used for mitigating potential errors in GNSS-position based probe lane assignment. In particular, the risk of map matching errors (MMEs) in probe lane assignment can be reduced.

Alternatively or additionally, providing or using the lane-specific data may comprise generating output based at least on the lane-specific speed characteristics, the output enabling an error in an GNSS position-based lane assignment to be corrected.

Thereby, information obtained in the probe speed clustering is made available by the processing system for use by a computing system or device different from the processing system, in order to mitigate potential errors in GNSS-position based probe lane assignment. In particular, the risk of map matching errors (MMEs) in probe lane assignment can be reduced.

The GNSS position-based lane assignment may assign the GNSS-based position data to a lane of the segment. The GNSS position-based lane assignment may comprise a map matching.

Thereby, the lane-specific data can be used to reduce MMEs in determining on which lane of the segment a vehicle travelling on the segment is located.

The processing system may be operative to determine the lane-specific data comprising the one or more lane-specific speed characteristics in a spatially resolved manner for a plurality of locations on the navigable network, respectively based on probe data obtained from probes travelling on the navigable network in proximity to or at the plurality of locations.

Thereby, the processing system determines the one or more lane-specific speed characteristics for several segments of the navigable network, facilitating the performance of the at least one lane level traffic-based function.

The method may further comprise performing a lane assignment based at least on the GNSS-based position data and the lane-specific data.

Thereby, the lane-specific data comprising the one or more lane-specific speed characteristics (in particular a lane-specific speed determined as mean, average, or median of a cluster) may be used to reduce the risk of MMEs in determining on which lane of the segment a probe is located.

The at least one lane level traffic-based function may be performed based at least on the lane assignment.

Thereby, the at least one lane level traffic-based function is performed based at least on a lane assignment that takes into consideration the lane-specific data comprising the one or more lane-specific speed characteristics (in particular a lane-specific speed determined as mean, average, or median of a cluster). Adverse effects of MMEs in determining on which lane of the segment a probe is located are thereby mitigated in performing the at least one lane level traffic-based function. Safety of an intended functionality of the at least one lane level traffic-based function is enhanced.

The method may further comprise identifying, based at least on the lane-specific speed characteristics, a discrepancy of an arrangement of lanes in the navigable network and electronic map data.

Thereby, the processing system is operative to detect, based on the clustering of probe speeds, locations on the navigable network at which there is a discrepancy between the number of speed clusters and the number of lanes in the electronic map.

The processing system may be operative to generate output indicative of the detected discrepancy and/or trigger a map data server to provide updated electronic map data in response to the processing system identifying the discrepancy.

Thereby, the processing system is operative to cause a corrective action to be performed to mitigate the risk that situations such as temporary lane closures can affect the safety of the intended functionality of the at least one lane level traffic-based function.

Determining the one or more lane-specific speed characteristics may comprise distinguishing lane-dependent variations and temporal variations of the probe speeds on the segment.

Thereby, the processing system is operative to take into consideration that probe speeds are not only affected by the lane but may also have variations as a function of time of day and/or day of week (e.g., due to different traffic density). The determination of the one or more lane-specific speed characteristics is made more reliable thereby, again improving the safety of the intended functionality of the at least one lane level traffic-based function.

Determining the lane-specific data may further comprise determining, by the processing system, lateral lane positions (i.e., lane positions in a direction transverse to an extension direction of the segment) based on a statistical distribution of GNSS-based lateral probe positions.

Thereby, the lateral lane positions can be identified. By making use of statistical techniques, the risk of adverse effects that can be caused by the inherent uncertainty of the GNSS position measurement are reduced.

Determining the lateral lane positions may comprise determining a lane-specific lateral offset between an average, median, or mean of the statistical distribution of GNSS-based lateral probe positions and a lateral lane position expected according to electronic map data.

Thereby, the processing system is operative to determine a quantity (the lane-specific lateral offset) having a magnitude indicative of systematic deviations between GNSS-based probe locations and lateral lane positions expected according to the electronic map data. Such systematic deviations may be caused by lane closure, lane swing, or other temporary changes in lane geometry. Identifying such situations is by itself valuable for performing the at least one lane level traffic-based function.

The statistical distribution of the GNSS-based lateral probe positions may be acquired over a first time interval, the clustering of probe speeds may be performed over a second time interval, wherein the first time interval is longer than the second time interval.

Thereby, the processing system is operative to take into account that changes in lane geometry, such as a lane swing or lane closure, is generally associated with a longer time scale. By determining the statistical distribution of the GNSS-based lateral probe positions over the first time interval, which is longer than the second time interval, the processing system can determine the lateral lane positions in a manner which is more robust against the uncertainty inherent in the GNSS-based position.

Determining the lateral lane positions may comprise ascertaining that, for the location for which the lateral lane positions are determined, GNSS-based position data: are available from a number of probes exceeding a probe number threshold (such as at least 10, at least 20, or at least 50); and/or have been monitored over a monitoring period (such as at least 1 hour, at least 2 hours, at least 5 hours, at least 12 hours, at least 24 hours, at least 2 days, at least 5 days, at least 7 days, or longer); and/or a variance or other metric for variations in the statistical distribution of the GNSS-based lateral positions fulfills a reliability criterion (such as being less than a threshold).

Thereby, the lateral lane positions can be determined conditionally dependent on and in response to ascertaining that at least one criterion is fulfilled which indicates that sufficient probe data can be taken into account for determining the lateral lane positions.

The method may further comprise performing a probe lane assignment, based at least on the one or more lane-specific speed characteristics.

Thereby, the lane-specific data, and in particular the one or more lane-specific speed characteristics, can be used for mitigating issues associated with uncertainty of GNSS positions and the associated uncertainty in a GNSS position-based probe lane assignment.

The probe lane assignment may be performed by the processing system.

Thereby, the processing system itself can use the one or more lane-specific speed characteristics to mitigate the risk of incorrect probe lane assignments. The more reliable probe lane assignment increases, in turn, reliability and safety of the at least one lane level traffic-based function.

The probe lane assignment may be performed by a computing system or device different from the processing system and communicatively coupled to the processing system. The computing system or device may comprise a vehicle system (e.g., an ADAS or autonomous driving system) and/or a map distribution system.

Thereby, the computing system or device can use the lane-specific data determined by the processing system to mitigate the risk of incorrect probe lane assignments. More reliable lane assignment increases, in turn, reliability and safety of the at least one lane level traffic-based function. The at least one lane level traffic-based function may be performed based on the probe lane assignment.

Thereby, the lane-specific data, and in particular the one or more lane-specific speed characteristics, can be used for performing the at least one lane level traffic-based function.

The at least one lane level traffic-based function may comprise one, several, or all of: route search or route guidance; identification of incorrect lane data in an electronic map; identification of maintenance work; traffic flow control; deployment of map updates.

Thereby, the lane-specific data can be used for performing one or several lane level traffic-based functions, based at least on the lane-level specific data.

The method may further comprise performing the at least one lane level traffic-based function. The at least one lane level traffic-based function may be performed by or onboard a vehicle, e.g., by a driver assistance system, an ADAS system, and/or an autonomous driving system.

Thereby, the lane-specific data can be used for performing one or several lane level traffic-based functions, based at least on the lane-level specific data.

The at least one lane level traffic-based function may comprise a route search or route guidance. The route search or route guidance may be a route search or route guidance based at least on the lane-specific data for a segment that has physical barriers between lanes assigned to a same driving direction.

Thereby, the risk of incorrectly determining lane-specific speed characteristics (such as lane-specific speeds) is mitigated in a case in which a physical barrier prevents passage between adjacent lanes. In such a case, unreliable lane-specific speed characteristics have the potential of being particularly detrimental to safety and reliability of the at least one lane level traffic-based function.

According to another aspect of the invention, there is disclosed machine-readable instruction code comprising instructions which, when executed by at least one processing circuit, cause the at least one processing circuit to perform the method of any one aspect or embodiment.

According to another aspect of the invention, there is disclosed a data carrier comprising machine-readable instruction code comprising instructions which, when executed by at least one processing circuit, cause the at least one processing circuit to perform the method of any one aspect or embodiment.

The data carrier may comprise a non-transitory storage medium having stored thereon the machine-readable instruction code.

According to a further aspect, there is disclosed a processing system for processing probe data for performance of at least one lane level traffic-based function. The processing system comprises at least one interface operative to receive the probe data from a plurality of probes travelling on a navigable network, wherein the probe data comprises global navigation satellite system, GNSS, -based position data. The processing system comprises at least one processing circuit operative to: determine, for a segment of the navigable network identified based at least on the GNSS-based position data, lane-specific data based at least on the probe data from probes on the segment, the at least one processing circuit being operative to obtain probe speeds for the probes on the segment based on the probe data from the probes on the segment; verify that the probe speeds are assignable to clusters of probe speeds; and determine one or more lane-specific speed characteristics based at least on a clustering of the probe speeds responsive to verifying that the probe speeds are assignable to clusters of probe speeds. The at least one processing circuit is operative to provide or use the lane-specific data for the performance of the at least one lane level traffic-based function.

Various effects and advantages are associated with the processing system. By determining one or more lane-specific speed characteristics based at least on a clustering of the probe speeds, the processing system takes advantage of the fact that, while GNSS positions are associated with an uncertainty that is on a same order of magnitude as a lane width, speeds can be determined more reliably. The processing system, thus, is operative to perform a technique of determining lane-specific speed characteristics that does not need to rely on GNSS position-based probe lane assignment. By determining the one or more lane-specific speed characteristics responsive to verifying that the probe speeds are assignable to clusters of probe speeds, the processing system uses a built-in check which reduces the risk of operating based on unreliable lane-specific speed characteristics. Mitigating the risk of potential inaccuracies in determining lane-specific speed characteristics enhances the reliability and safety of lane level traffic-based functions, such as routing, navigation, driver assistance, ADAS functions, and/or autonomous driving functions that are dependent on traffic at the lane level.

The processing system may be operative to perform the method according to any aspect or embodiment disclosed herein.

Optional features of the processing system and the features respectively attained thereby may correspond to the features and effects described in association with the method.

According to a further aspect, there is disclosed a system comprising the processing system and at least one device (such as at least one probe which may be included in the plurality of probes or which may be separate therefrom, or another vehicle component such as an ADAS and/or autonomous driving system) operative to receive the lane-specific data and perform the at least one lane level traffic-based function based at least one the lane-specific data.

Thereby, safety and reliability are enhanced when performing the at least one lane level traffic-based function.

According to a further aspect, there is disclosed a vehicle comprising an interface (such as a wireless interface) operative to receive the lane-specific data, and further comprising at least one processing device operative to perform at least one lane level traffic-based function based at least one the lane-specific data. The control operation may comprise an actuator control operation. Thereby, safety and reliability are enhanced when performing the at least one lane level traffic-based function.

According to a further aspect, there is disclosed a method of reducing the risk of incorrectly determining lane-specific speed characteristics, the method comprising using the lane-specific data determined by the method and/or processing system according to an aspect or embodiment when performing the at least one lane level traffic-based function.

While the techniques disclosed herein may be used for navigation, route search, driver assistance, ADAS, and autonomous driving functions, they are not limited thereto.

BRIEF DESCRIPTION OF THE DRAWINGS

Embodiments of the invention will be described with reference to the drawings in which similar or corresponding reference signs designate elements having similar or corresponding configuration and/or function.

DETAILED DESCRIPTION OF EMBODIMENTS

Figure 1:
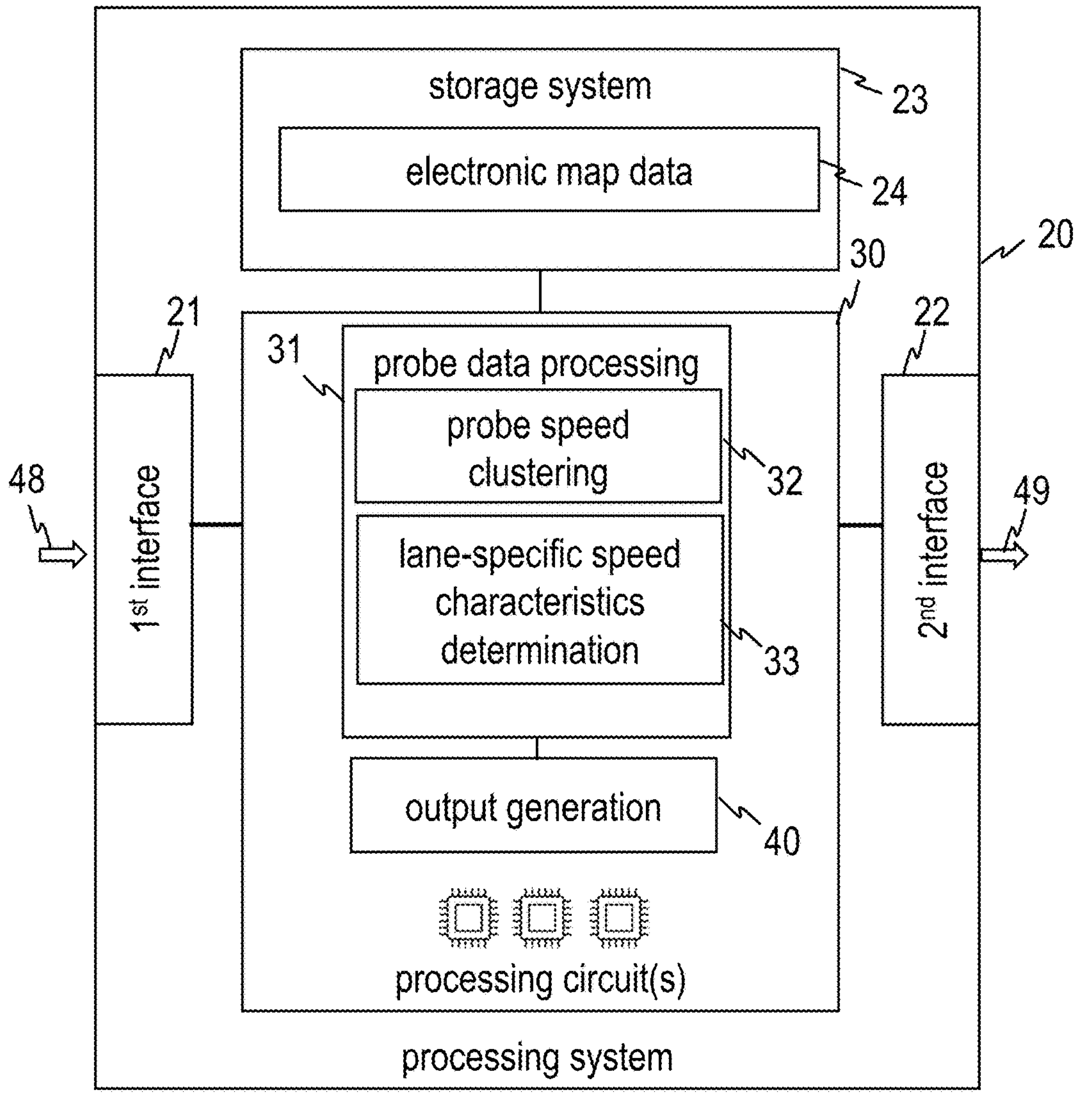
FIG. 1 is a schematic representation of a processing system operative to perform a method of processing probe data for performance of at least one lane level traffic-based function.

Embodiments of the invention will be described in detail. While some embodiments will be described in association with specific exemplary lane arrangements, the embodiments are not limited thereto.

The features of embodiments may be combined with each other unless specifically stated otherwise.

The techniques disclosed herein in detail are operative to process probe data comprising a clustering of probe speeds to obtain one or several lane-specific speed characteristics for use in performance of at least one lane level traffic-based function. Thus, the techniques disclosed herein take advantage of the fact that probe speeds of probes travelling on a navigable network can normally be determined with good accuracy, while global navigation satellite system (GNSS)-based positions are associated with uncertainties that may affect the reliability of a probe lane assignment.

As used herein, the term "probe" encompasses a navigation device but need not be limited thereto. Probe data may indicate probe traces also for devices that do not perform navigation-related functions. A probe may be an in-dashboard navigation device, a portable navigation device (PND), a mobile terminal (MT) of a cellular communication network (e.g., a smartphone) that may (but does not need to) perform a navigation-related operation, without being limited thereto.

The term "navigation device" as used herein encompasses an in-dashboard navigation device, a portable navigation device (PND), a mobile terminal (MT) of a cellular communication network that performs a navigation-related function, such as a smartphone, without being limited thereto.

As used herein, a "probe" may in particular be a probe that is fixedly or removably provided in a vehicle, so as to move jointly with the vehicle. Thus, a "probe position" is also indicative of a vehicle position, and/or a "probe speed" is also indicative of a vehicle speed. These terms may be interchanged, unless explicitly stated otherwise.

As used herein, a "lane level traffic-based function" refers to a function that takes into account that conditions can be different for different lanes adjacent to each other on a same segment of the navigable network. The different conditions may comprise dynamic lane conditions, such as lane-level specific speeds or speed variances. The techniques disclosed herein are operative to allow lane-specific data to be determined more reliably (e.g., by reducing the risk of incorrect probe lane assignment, which in turn increases the quality of any lane level traffic-indicating quantity determined from the probe data, such as lane-specific speeds) and/or to determine, for any device or system that performs the lane level traffic based function, more reliably on which lane that device or vehicle is positioned.

As used herein, a "segment" of the navigable network encompasses a road segment, without being limited thereto. The segment may be defined in electronic map data by at least two nodes, which in turn may be defined in the electronic map data by their geospatial coordinates (such as latitude and longitude, without being limited thereto). In case of an electronic map that includes road definitions that can include more than two nodes, the techniques disclosed herein are applicable to any segment of such a road between two adjacent nodes of the road definition.

As used herein, an "extension direction" of a segment refers to the direction along which the segment extends. In case of an electronic map that includes road definitions that can include more than two nodes, the techniques disclosed herein are applicable to any segment of such a road between two adjacent nodes of the road definition, which extends along a straight extension direction.

As used herein, a "direction transverse to the extension direction of the segment" refers to a direction that extends transverse (optionally perpendicular) to the extension direction. This direction is also referred to as "lateral" (as it is the left-right direction from the perspective of a vehicle driving along the extension direction on the segment).

As used herein, a "lane assignment" refers to assigning a probe to a lane.

As used herein, "GNSS-based position data" may comprise, for example, GPS-based position data, such as a global positioning system (GPS) fix, several GPS fixes, or a GPS trajectory.

As used herein, a "map matching error" (MME) refers to a shift of a GNSS-based position (e.g., a GPS fix) in the lateral direction.

A currently available precision of global positioning system (GPS)-based positions results in a spread of MMEs with a standard-deviation of 1.5 to 2.5 meters for single lane roads. Assuming a lane width of 3 to 3.5 meters, only about 60% of GPS data is matched to the correct lane by MME only. On the other hand, speed can be measured accurately. The method and processing system disclosed herein use a clustering of probe speeds to distinguish sets of probes sharing a common set of lanes.

If the MME correlates with speed, then this indicates a lane dependent traffic situation. In such a case, the method and processing system can safely assume that probes driving at a same speed share a same subset of the available lanes. This is in contrast e.g. to volatile speeds in front of a traffic-lights, where speeds do not correlate with the MME since the speed volatility is time dependent.

By clustering the probes by probe speeds, the methods and processing systems determine sets of probes with common lanes, and can allocate the probe speeds to lanes.

FIG. 1 is a schematic representation of a processing system 20 operative to perform a method of processing probe data for performance of at least one lane level traffic-based function.

The processing system 20 comprises at least one interface 21 operative to receive probe data 48 from a plurality of probes. The probe data 48 comprises GNSS-based position data (such as GPS fixes and/or GPS traces). The probe data 48 may include probe speed data separate from the GNSS-based position data, even though this is optional. The processing system 20 comprises at least one processing circuit 30 operative to process the probe data 48. The at least one processing circuit 30 may comprise any one or any combination of integrated circuits, integrated semiconductor circuits, processors, controllers, application specific integrated circuits (ASICs), field programmable gate arrays (FPGAs), circuit(s) including quantum bits (qubits) and/or quantum gates, without being limited thereto.

The processing system 20 comprises a storage system 23 is operative to communicatively interface with a storage system 23 that has stored therein in electronic map data 24. The electronic map data defines a navigable network. The navigable network comprises nodes and segments extending between at least two nodes. The electronic map data may comprise lane data useful in performance of lane level traffic-based functions The at least one processing circuit 30 is operative to perform a probe data processing 31 of the received probe data 48. The at least one processing circuit 30 is operative such that the probe data processing 31 comprises a probe speed cluster 32 of probe speeds obtained from the probe data 48 (e.g., by retrieval of probe speeds included in the probe data 48 and/or by computing the probe speeds based on GPS fixes and/or based on GPS traces) for probes located on a segment of the navigable network. The probe data processing 31 comprises a determination 33 of one or several lane-specific speed characteristics. The one or several lane specific speed characteristics may comprise a lane-specific speed. The at least one processing circuit 30 may be operative to determine the lane-specific speed from an average, median or mean of a cluster obtained in the clustering of probe speeds. The one or several lane specific speed characteristics may alternatively or additionally comprise a lane-specific measure indicative of speed fluctuations on the lane. The at least one processing circuit 30 may be operative to determine the lane-specific speed uncertainty measure from a variance or other metric quantifying variations of probe speeds within a cluster obtained in the clustering of probe speeds.

The at least one processing circuit 30 is operative to perform an output generation 42 to cause output 49 to be provided for use in the performance of at least one lane level traffic-based function. The at least one processing circuit 30 may be operative to cause the output 49 to be provided via the interface 21 or a second interface 22 separate from the interface 21. The output generation 40 may generate the output 49 based at least on the at least one lane-specific speed characteristics determined by the probe data processing 31.

The processing system 20 may be operative to perform the determination of the one or several lane-specific speed characteristics for several segments of the navigable network, for use in performing the at least one lane level traffic-based function. Thus, the processing system 20 may be operative to perform the various operations discussed herein for each of a plurality of segments of the navigable network defined by the electronic map data. However, the determination of the one or several lane-specific speed characteristics need not be made for all segments of the navigable network.

The at least one processing circuit 30 may be operative such that the output 49 comprises, for each of a plurality of segments of the navigable network, lane-specific data that comprises or is otherwise based on the one or several lane-specific speed characteristics. For illustration, and as will be explained in more detail herein, the at least one processing circuit 30 may be operative to determine the one or several lane-specific speed characteristics, use the one or several lane-specific speed characteristics to improve a lane assignment of probes to lanes, and then determine lane-specific additional lane-specific data based on this improved assignment. In this case, the output 49 may comprise the lane-specific one or several lane-specific speed characteristics, which are useful for performing functions such as lane level traffic-based route search and/or route guidance, lane level traffic-based cruise control and/or lane keeping assistance, a lane level traffic-based ADAS function, and/or a lane level traffic-based autonomous driving function. The output 49 may optionally comprise additional information that is determined by the processing system based on the one or several lane-specific speed characteristics, such as information on changes in lane geometry (such as a change in lane count as compared to the electronic map data).

Operation of the techniques disclosed herein will be explained further with reference to an exemplary scenario illustrated in FIG. 2 and FIG. 3.

Figure 2:
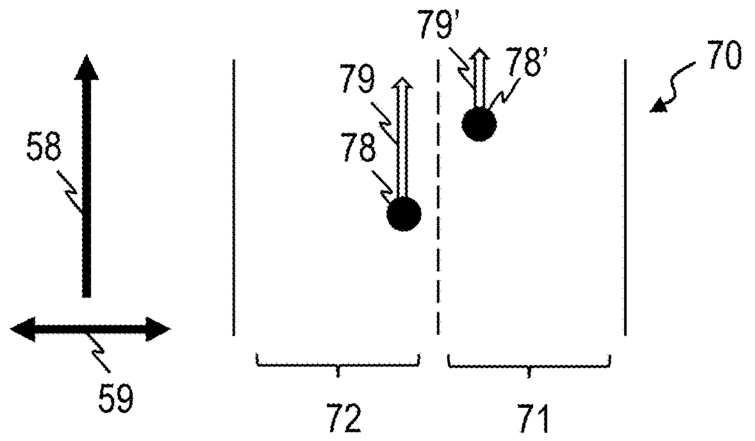
FIG. 2 is a schematic representation of lanes of a segment to illustrate operation of the processing system.

FIG. 2 shows an exemplary scenario in which a road 70 (part of which is represented by a segment of the navigable network defined by the electronic map data) has several lanes 71, 72, e.g., for a same driving direction. The several lanes 71, 72 are offset from each other along a lateral direction 59 transverse (e.g., perpendicular) to an extension direction 58 of the segment. A GNSS-position based lane assignment may be challenging for probes 78, 78' located such that the uncertainty of the GNSS position determination is comparable to a distance form a lane boundary or even comparable to a lane width. This also affects the reliability of lane-specific speeds that are determined based on a probe lane assignment that suffers from the uncertainty of the GNSS position.

The processing system 20 and methods disclosed herein take advantage of the fact that probe speeds 78, 78' are not affected from this uncertainty of the GNSS-based position, and that the probe speeds 78, 78' often have a correlation with lane (at least for situations other than in front of a traffic light or junction, where vehicle speeds need not necessarily correlate with lane). Thus, the processing system 20 and methods disclosed herein are operative to use probe speeds, and more specifically a clustering of probe speeds, to determine one or several lane-specific speed characteristics. The lane-specific speed characteristics may, but do not necessarily have to, be used to improve the probe lane assignment, using the determined speed clusters in association with a probe speed to determine on which lane the probe is likely located.

Figure 3:
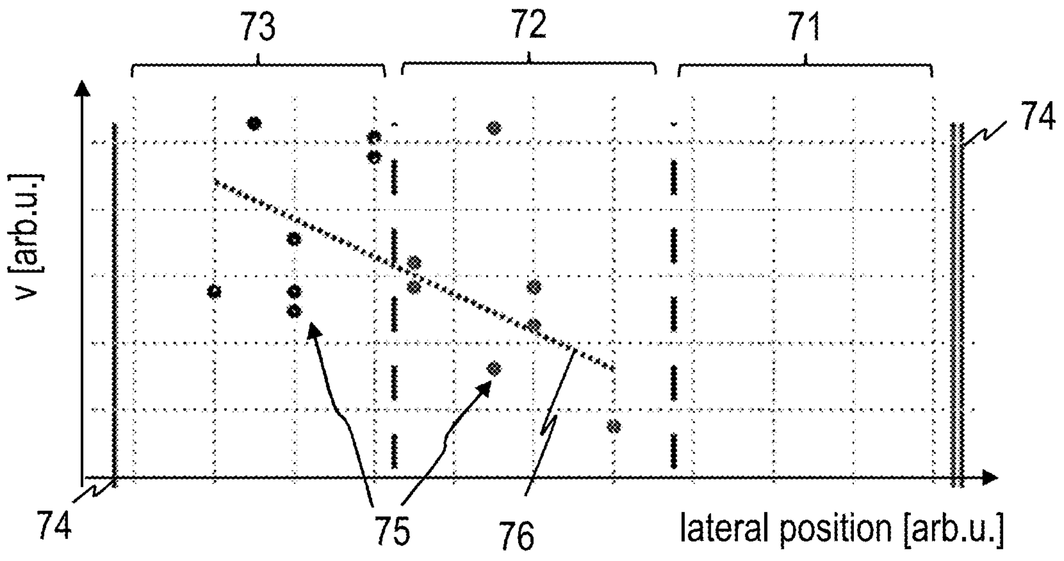
FIG. 3 is a schematic representation of probe speeds as a function of lateral position on the segment to illustrate operation of the processing system.

FIG. 3 shows probe speeds (y-axis) as a function of lateral probe position (x-axis) on a road comprising several lanes 71, 72, 73 having a same driving direction. The road boundaries 74 and lane delimiters are also included for ease of understanding. While the probe speeds 75 on any lane can vary significantly, there is a general correlation 76 of lateral probe position and probe speed. The processing system 20 and methods disclosed herein take advantage of the fact that probe speeds 78, 78' have a correlation with the lateral position and, thus, the lane on which the probes are located. Thus, the processing system 20 and methods disclosed herein are operative to use probe speeds, and more specifically a clustering of probe speeds, to determine one or several lane-specific speed characteristics.

Figure 4:
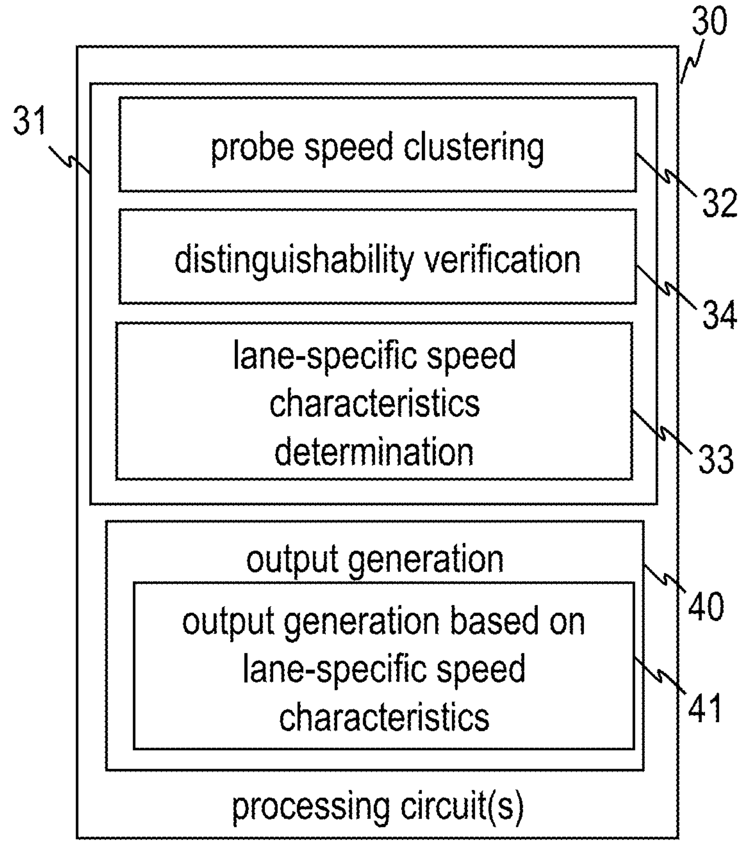
FIG. 4 is a schematic representation of at least one processing circuit operative to perform a method of processing probe data for performance of at least one lane level traffic-based function.

FIG. 4 is a schematic representation illustrating operation of the at least one processing circuit 30.

The at least one processing circuit 30 is operative to perform the probe speed clustering 32, including determining, based on the probe data, probe speeds for probes on a segment of the navigable network and clustering the thus determined probe speeds. The clustering may be performed using a lane count for the segment retrieved from the electronic map data 24 to define a number of clusters. Preferably, the clustering is performed with the number of clusters being an inherent result of the clustering, i.e., using a clustering technique in which the number of clusters is not predefined.

The at least one processing circuit 30 is operative to perform a verification 34 to verify that clustering results in sufficiently distinguishable clusters. The verification 34 may comprise determining Pearson correlations and/or another linear or non-linear correlation measure between any pair of clusters for the segment to confirm that there is a desired correlation of lateral probe position and probe speed within a cluster.

The at least one processing circuit 34 is operative to perform the determination 33 of one or several lane-specific speed characteristics responsive to verifying that the probe speeds can be clustered into clusters associated with different lanes. The at least one processing circuit 30 may be operative such that the determination 33 of the one or more lane-specific speed characteristics may comprise determining a mean, median or average speed for a cluster of the clusters of probe speeds, in particular for each of the clusters of probe speeds. The lane-specific speed may be set equal to the determined mean, median or average speed. The at least one processing circuit 30 may be operative such that the determination 33 of the one or more lane-specific speed characteristics may comprise determining an uncertainty measure for a cluster of the clusters of probe speeds, in particular for each of the clusters of probe speeds. The uncertainty measure may comprise a variance or another measure quantifying the deviation of probe speeds within a same cluster from each other.

The at least one processing circuit 30 is operative to perform an output generation 40 which comprises a generation 41 of output that is based at least on the one or several lane-specific speed characteristics. For illustration, the at least one processing circuit 30 may be operative such that the output generation 40 comprises generating the output 49 such that it includes at least one of the one or several lane-specific speed characteristics, for use in performing the at least one lane level traffic-based function. Alternatively or additionally, the at least one processing circuit 30 may be operative to use the one or several lane-specific speed characteristics to determine additional or alternative lane-specific data that depends on the one or several lane-specific speed characteristics. For illustration, the at least one processing circuit 30 may be operative to use the one or several lane-specific speed characteristics to assist in or perform a probe lane assignment, with the output 49 being based on the probe lane assignment.

Figure 5:
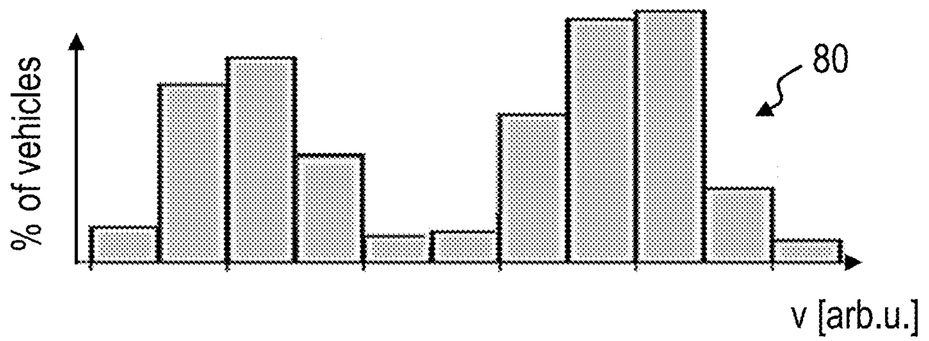
FIG. 5 is a schematic representation of a statistical distribution of probe speeds.

FIG. 5 shows an exemplary statistical distribution 80 of probe speeds. The x-axis shows the difference the probe speed. The y-axis shows the fraction of vehicles for a respective lateral position range (which defines a bin for forming the histogram of FIG. 5). The at least one processing circuit 30 is operative to use the statistics of probe speeds, collected over several probes and over a time interval, to perform a clustering, with the clustering providing one or several probe speed clusters, each associated with one of the lanes.

The processing disclosed herein may be performed for a plurality of segments and, optionally, possibly even for several locations on a same segment of the navigable network.

Figure 6:
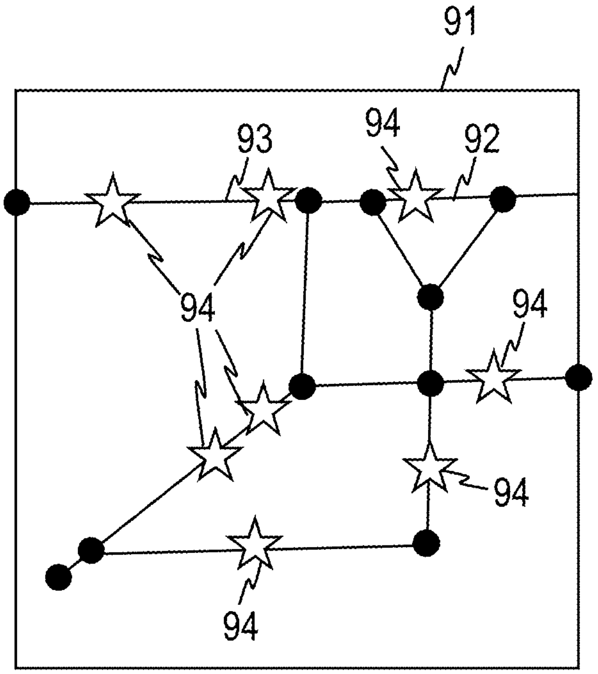
FIG. 6 is a schematic representation of a portion of a navigable network.

FIG. 6 schematically shows a portion 91 of a navigable network. The navigable network comprises a plurality of segments 92, 93. Each segment may be defined by at least two nodes. The processing system 20 may be operative to receive and process the probe data from probes passing a plurality of locations 94 on the navigable network and determine the one or several lane-specific speed characteristics for each of the plurality of locations 94.

The one or several lane-specific speed characteristics, thus determined in a spatially resolved manner, may then be used to perform the at least one lane level traffic-based function.

Figure 7:
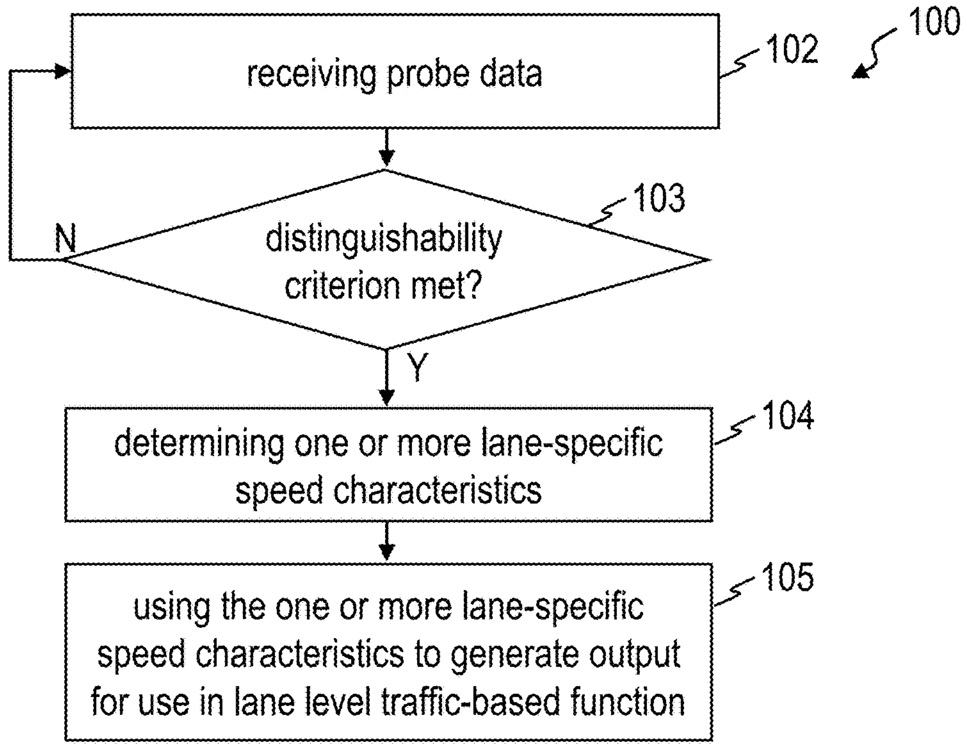
FIG. 7 is a flow chart of a method.

FIG. 7 is a flow chart of a method 100. The method 100 may be performed automatically by or using the processing system 20 or by a system that comprises the processing system 20.

At process block 102, the processing system 20 receives the probe data 48 comprising GNSS-based position data. The GNSS-based position data may comprise GPS fixes and/or a GPS traces. The probe data may comprise data other than GNSS-based position data, such as probe speeds collected by a speed sensor different from the GNSS receiver of the probe. The processing system 20 may be operative to receive the probe data 48 from the probes via a communication system that may comprise a wide area network (WAN) and/or a cellular communication system.

At process block 103, the processing system 20 verifies that clustering of probe speeds results in sufficiently distinguishable clusters for the various lanes. The verification that clustering of probe speeds results in sufficiently distinguishable clusters for the various lanes may comprise determining Pearson correlations and/or another linear or non-linear correlation measure between any pair of clusters for the segment to confirm that there is a desired correlation of lateral probe position and probe speed within a cluster. The verification may optionally be performed taking into consideration both probe speed and the GNSS-based lateral position of the respective probe, to determine whether there is a correlation, as schematically indicated in FIG. 3. Selectively dependent on a result of the verification, clustering of probe speeds is performed or the method returns to process block 102.

At process block 104, responsive to verifying that clustering of probe speeds results in sufficiently distinguishable clusters for the various lanes, the processing system 20 determines the one or several lane-specific speed characteristics based on a clustering of the probe speeds on the respective segment. Determining the one or several lane-specific speed characteristics may comprise determining a lane-specific speed based on a mean, average, or median of the probe speeds of a cluster. Determining the one or several lane-specific speed characteristics may comprise determining a lane-specific speed variation based on a variance or other measure of deviations within a cluster of probe speeds. The one or several lane-specific speed characteristics may be determined for each of the lanes, respectively from the associated cluster of probe speeds.

At process block 105, the processing system 20 generates output that is dependent on the one or more lane-specific speed characteristics. Process block 105 may comprise using the one or more lane-specific speed characteristics for performance of the at least one lane traffic level-based function. The at least one lane traffic level-based function may be performed by the processing system 20 or a computing system or device distinct from the processing system 20 and communicatively coupled to the processing system uses the one or more lane-specific speed characteristics The output may comprise the one or several lane-specific speed characteristics. The output may alternatively or additionally comprise lane-specific data determined using the one or several lane-specific speed characteristics.

Figure 8:
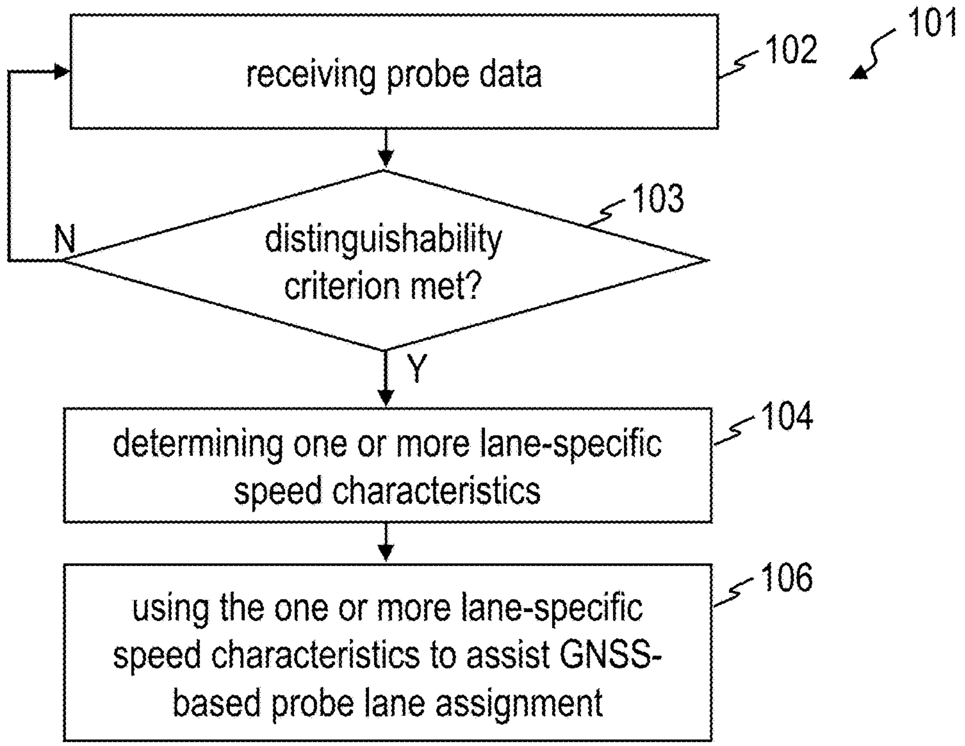
FIG. 8 is a flow chart of a method.

FIG. 8 is a flow chart of a method 101. The method 101 may be performed automatically by the processing system 20 or by a system comprising the processing system 20.

Process blocks 102, 103, and 104 may be implemented as previously explained with reference to FIG. 7.

At process block 106, the processing system 20 or a computing system or device separate from the processing system and communicatively coupled to the processing system 20, uses the one or several lane-specific speed characteristics to assist in a GNSS position-based probe lane assignment. Assisting in the GNSS-based probe lane assignment comprises using a probe speed in association with the results of the clustering to verify, and optionally to improve, a probe lane assignment that was performed by matching the GNSS-based lateral probe position to a lane of the segment.

Figure 9:
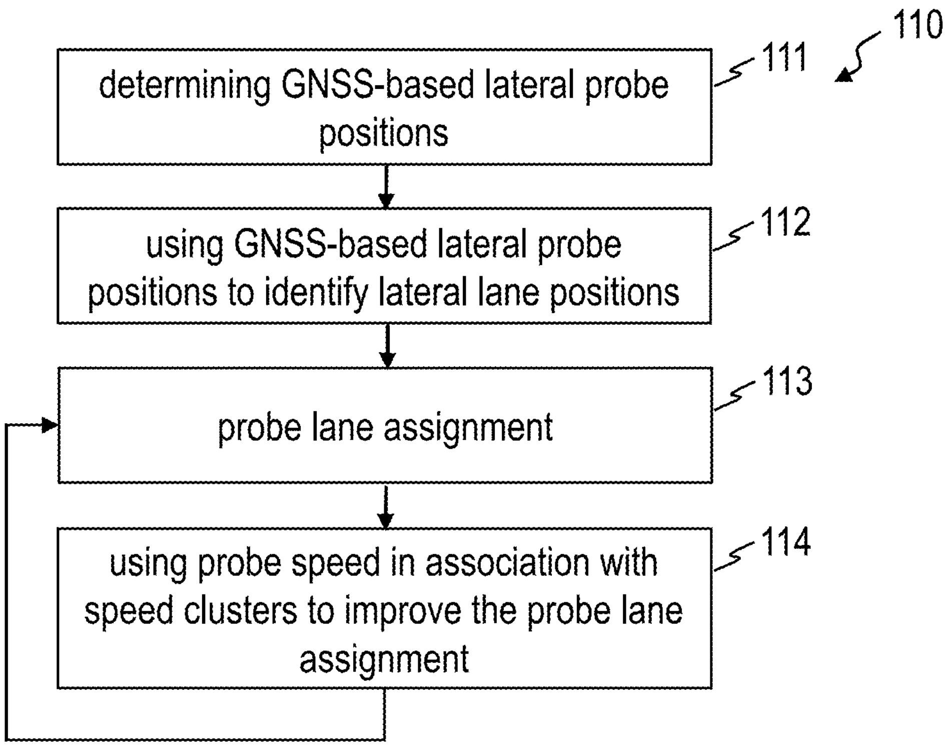
FIG. 9 is a flow chart of a method.

FIG. 9 is a flow chart of a process 110. The process 110 may be performed automatically by the processing system 20 or by a system comprising the processing system 20. The process 110 may be performed to implement process block 106 of FIG. 8.

At process block 111, the processing system determines GNSS-based lateral probe positions based on the probe data (and more specifically based on the GNSS-based position data of the probe data) and based on the extension direction of the segment (which is obtained from the electronic map data 24).

At process block 112, the processing system 20 uses the GNSS-based lateral probe positions to determine lateral lane positions (i.e., the positions of the lanes relative to a reference, such as a road center). By determining the lane positions based on the probe data, the lane positions are established in a data-driven manner. This approach also affords robustness against shifts caused by, e.g., lane closure, lane swing, or GNSS signal reflections. Details of this approach are disclosed in applicant's co-pending application entitled "Method and processing system for processing probe data for performance of at least one lane level traffic-based function," Application No. EP23219314.4, filed on Dec. 21, 2023. The respective techniques disclosed in the co-pending application may be used for performing the determination of the lateral lane position in the present application.

At process block 113, a probe lane assignment is performed, by comparing a GNSS-based lateral probe position to the lateral lane positions identified at process block 112.

At process block 114, the processing system 20 (or a computing system or device distinct from the processing system 20 and communicatively coupled to the processing system 20) uses the probe speed for the probe in association with the speed clusters identified for the segment to improve the probe lane assignment. This may comprise checking whether the probe speed is assigned to a probe speed cluster that is associated with the lane to which the probe was assigned at process block 113. Improving the probe lane assignment may comprise discarding the probe lane assignment from process block 113 if the probe speed is assigned to a probe speed cluster other than the one that is associated with the lane to which the probe was assigned at process block 113. Thereby, the risk of incorrect probe lane assignment is mitigated. Improving the probe lane assignment may comprise selectively overriding the probe lane assignment from process block 113 by assigning the probe in a probe-speed based manner to the lane that corresponds to the probe speed cluster to which the probe speed is assigned in the clustering.

All process blocks 111, 112, 113, 114 may be repeated in a recurring manner during field operation of the processing system 20. However, it is preferred that at least process block 114 (and optionally process blocks 113 and 114) be repeated more frequently than process block 112. This takes into account that determining lane positions from GNSS-based lateral probe positions (process block 112) typically requires a more extensive dataset of GNSS-based position data than probe speed-based techniques (process block 114). In other words, the time scales on which the technique of determining lane positions based on GNSS-based lateral probe positions and probe speed based techniques operate may be different.

Figure 10:
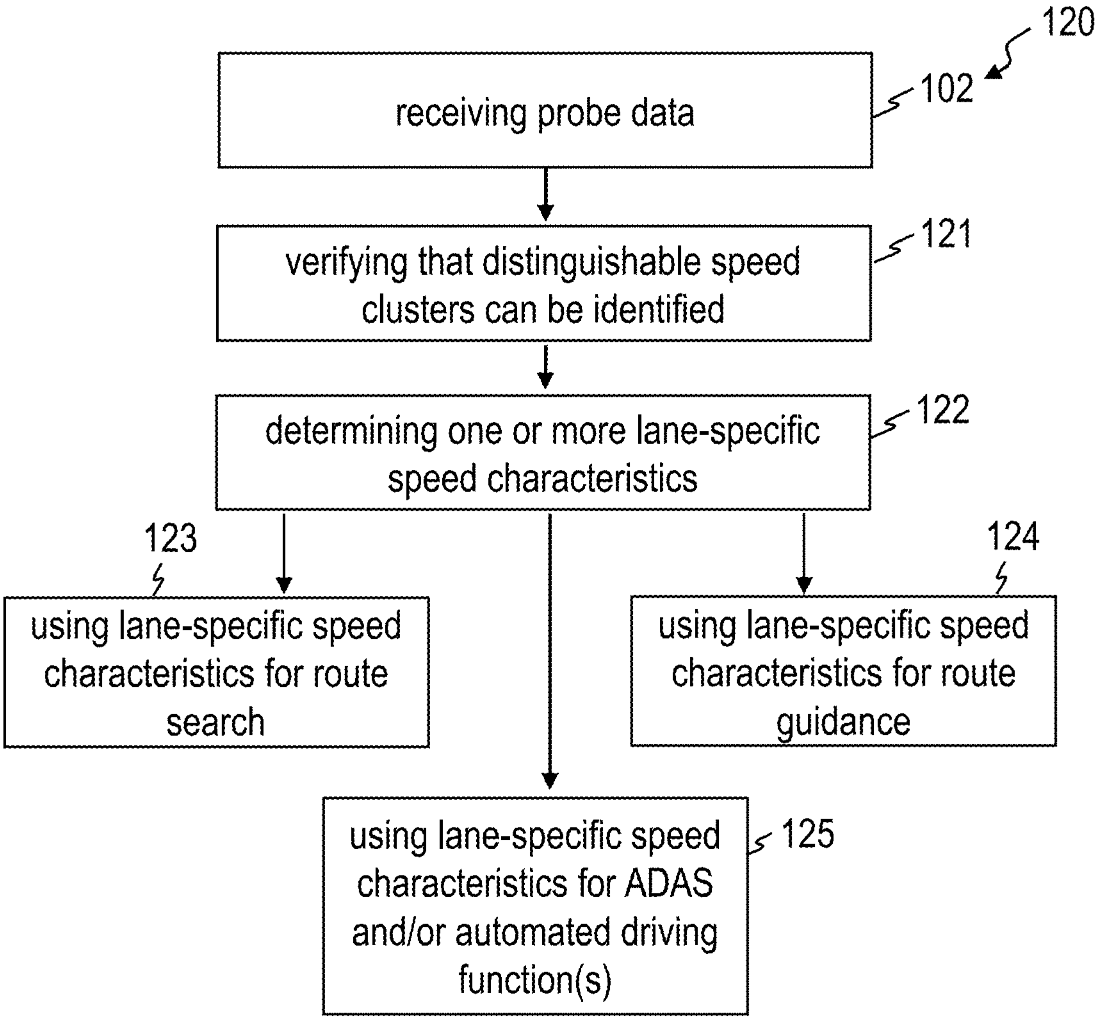
FIG. 10 is a flow chart of a method.

FIG. 10 is a flow chart of a method 120. The method 120 may be performed automatically by the processing system 20 or by a system comprising the processing system 20.

Process block 102 may be implemented as previously explained with reference to FIG. 7.

At process block 121, the processing system 20 verifies that clustering of probe speeds results in sufficiently distinguishable clusters for the various lanes. The verification that clustering of probe speeds results in sufficiently distinguishable clusters for the various lanes may comprise determining Pearson correlations and/or another linear or non-linear correlation measure between any pair of clusters for the segment to confirm that there is a desired correlation of lateral probe position and probe speed within a cluster. The verification may optionally be performed taking into consideration both probe speed and the GNSS-based lateral position of the respective probe, to determine whether there is a correlation.

At process block 122, responsive to verifying that clustering of probe speeds results in sufficiently distinguishable clusters for the various lanes, the processing system 20 determines the one or several lane-specific speed characteristics based on a clustering of the probe speeds on the respective segment. Determining the one or several lane-specific speed characteristics may comprise determining a lane-specific speed based on a mean, average, or median of the probe speeds of a cluster. Determining the one or several lane-specific speed characteristics may comprise determining a lane-specific speed variation based on a variance or other measure of deviations within a cluster of probe speeds. The one or several lane-specific speed characteristics may be determined for each of the lanes, respectively from the associated cluster of probe speeds.

The method may comprise one, several or all of process blocks 123, 124, and 125.

At process block 123, the lane-specific data comprising the at least one lane-specific speed characteristics may be used, by the processing system 20 or a computing system or device communicatively coupled to the processing system 20, to perform a route search, taking into consideration lane level traffic conditions as reflected by the lane-specific data.

At process block 124, the lane-specific data comprising the at least one lane-specific speed characteristics may be used, by the processing system 20 or a computing system or device communicatively coupled to the processing system 20, to perform route guidance, taking into consideration lane level traffic conditions as reflected by the lane-specific data. For illustration, lane level speeds and/or lane level closure information may be taken into consideration when providing route guidance, in particular when lanes of a same driving direction are separated by a physical barrier.

At process block 125, the lane-specific data comprising the at least one lane-specific speed characteristics may be used, for example by a computing system or device communicatively coupled to the processing system 20, to perform an ADAS and/or automated driving function, taking into consideration lane level traffic conditions as reflected by the lane-specific data. For illustration, lane level speeds may be taken into consideration for adaptive cruise control and/or lane keeping control. Variations in lane level speeds may be taken into consideration for selecting or suggesting a suitable lane.

Figure 11:
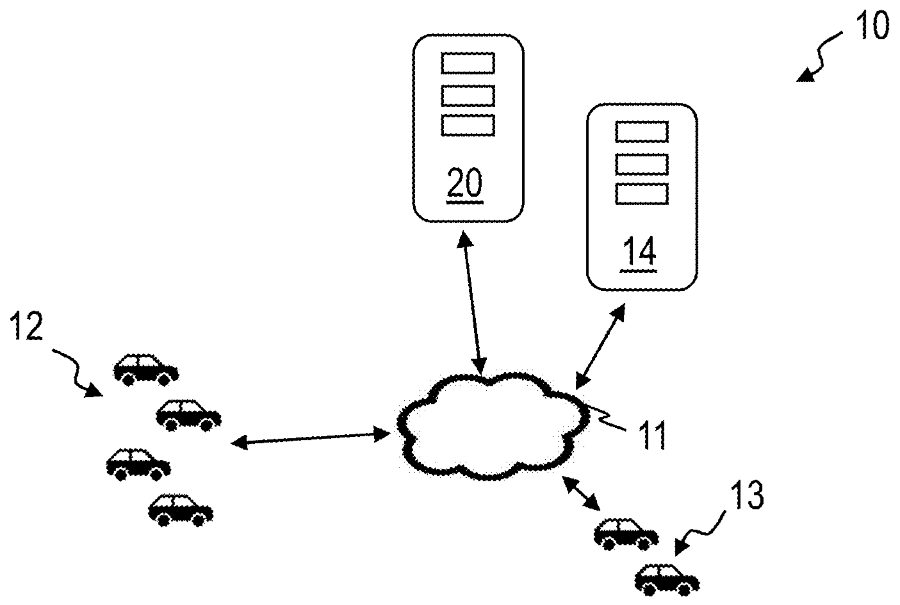
FIG. 11 is a schematic representation of a system comprising a plurality of probes and a processing system operative to perform a method of processing probe data for performance of at least one lane level traffic-based function.

FIG. 11 is a schematic representation of a system 10. The system 10 comprises the processing system 20.

The system 10 comprises a plurality of probes 12, which may include probes fixedly or removably arranged in the a plurality of vehicles. Each of the probes includes at least a GNSS-based receiver and a wireless interface operative to provide GNSS-based position data (and optionally other probe data) to the processing system 20 via a communication system 11. The communication system 11 may comprise a WAN and/or a cellular network.

The processing system 20 is operative to process the probe data to generate lane-specific data. The lane-specific data includes, for each of several segments of the navigable network, one or several lane-specific speed characteristics. The lane-specific data may alternatively or additionally include other lane-specific data. At least some of the other lane-specific data may be based on a probe lane assignment that takes into consideration one or several lane-specific speed characteristics.

The processing system 20 may be operative to use the lane-specific data to perform functions such as a lane level traffic-based route search and/or a lane level traffic-based route guidance. The processing system 20 may be operative to provide results of the route search and/or route guidance for outputting via a human machine interface (HMI). Alternatively or additionally, the processing system 20 may be operative to provide output including or otherwise based on the lane-specific data for use in performance of at least one lane level traffic-based function by a computing system 14 and/or a device installed in at least one vehicle 13 and/or for use by at least some of the probes 12. The computing system 14 and/or device installed in the at least one vehicle 13 may be operative to perform, based at least one the output received from the processing system 20, the at least one lane level traffic-based function, such as a lane level traffic-based route search, a lane level traffic-based route guidance, a lane level traffic-based driver assistance function, a lane level traffic-based ADAS function, and/or a lane level traffic-based autonomous driving function. The computing system 14 may alternatively or additionally be operative to provide functions such as providing, based on the output of the processing system 20, map data that depends on the output of the processing system 20. For illustration, the computing system 14 may comprise at least one map server and may be operative to update electronic map data responsive to the output of the processing system 20 indicating that there is change in lane geometry (e.g., a change in lane count) as compared to a currently used version of the electronic map data. The computing system 14 may distribute the electronic map data, updated based on the output of the processing system 20, for use in performance of at least one lane level traffic-based function.

Figure 12:
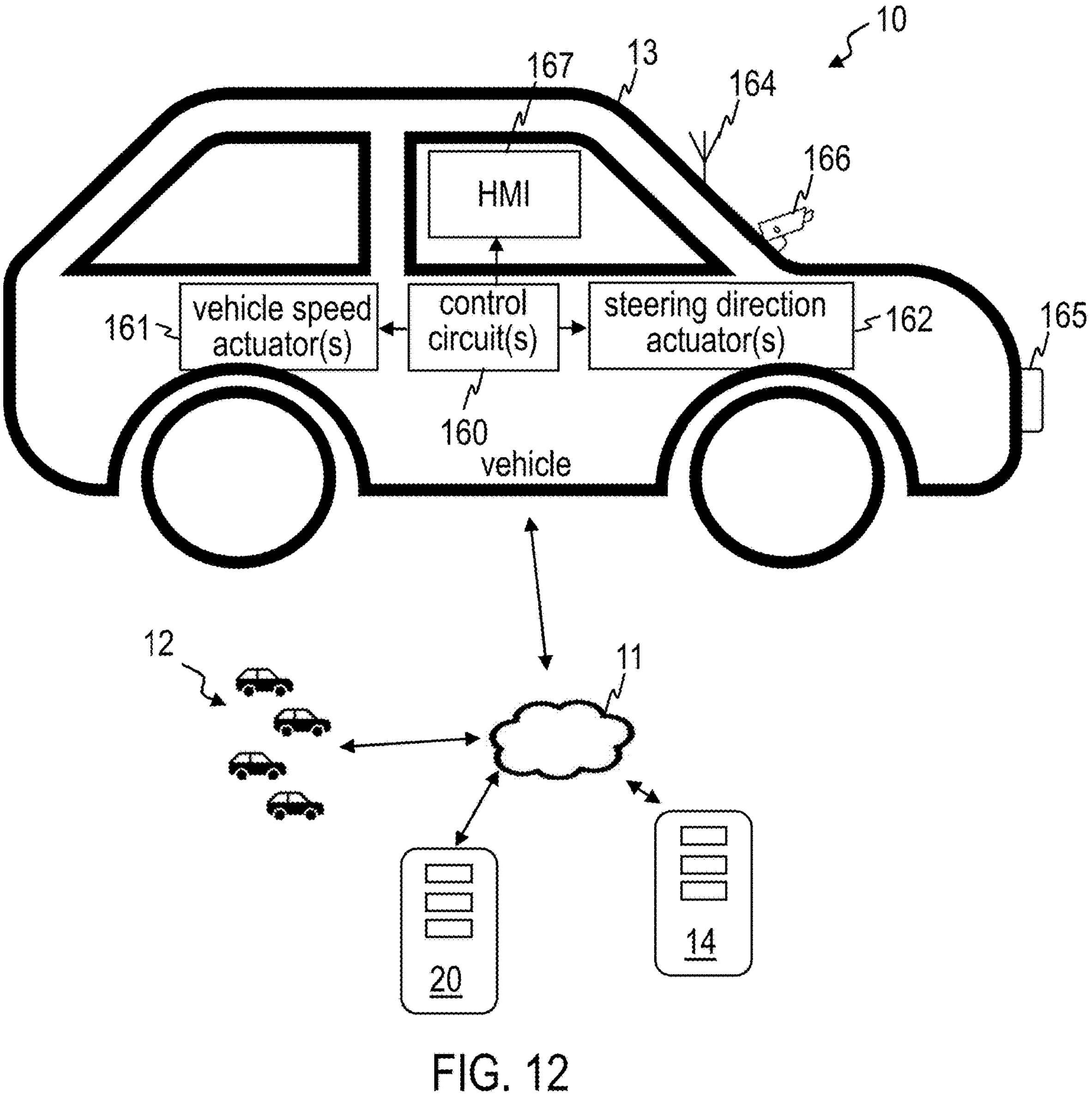
FIG. 12 is a schematic representation of a system comprising a processing system operative to perform a method of processing probe data for performance of at least one lane level traffic-based function and a vehicle operative to use output generated using the processing system.

FIG. 12 is a schematic representation of a system 10. The system 10 comprises the processing system 20.

The system 10 comprises a plurality of probes 12, which may include probes fixedly or removably arranged in the a plurality of vehicles. Each of the probes includes at least a GNSS-based receiver and a wireless interface operative to provide GNSS-based position data (and optionally other probe data) to the processing system 20 via a communication system 11. The communication system 11 may comprise a WAN and/or a cellular network.

The system 10 comprises a vehicle 13. The vehicle 13 comprises at least one control circuit 160 (i.e., one or several control circuits 160). The at least one control circuit 160 may comprise any one or any combination of integrated circuits, integrated semiconductor circuits, processors, controllers, application specific integrated circuits (ASICs), field programmable gate arrays (FPGAs), circuit(s) including quantum bits (qubits) and/or quantum gates, without being limited thereto.

The vehicle 13 comprises a wireless interface 164 operative to receive the output provided by the processing system 20 and/or electronic map data provided by the map server 14 responsive to the output of the processing system 20, with the output being based at least on the lane-specific data (e.g., on the one or several lane-specific speed characteristics) determined by the processing system 20.

The at least one control circuit 160 may be operative to perform one or several control operations based on the output provided by the processing system 20 and/or the electronic map data provided by the map server 14 responsive to the output of the processing system 20. For illustration, the at least one control circuit 160 may be operative to use the received data, which depends on the lane-specific data provided by the processing system 20, to perform lane level traffic-based route guidance and/or route search. The at least one control circuit 160 may be operative to control an HMI 167 of the vehicle 13 to output a result of the at least one lane level traffic-based route search and/or route guidance.

Alternatively or additionally, the at least one control circuit 160 may be operative to control one or several actuators of the vehicle 13 based on the received data, which is dependent on the lane-specific data determined by the processing system 20. The one or several actuators may comprise a vehicle speed actuator 161 which is operative to be actuated to influence the vehicle speed or engine torque, and/or a steering direction actuator 162 which is operative to be actuated to influence a driving direction of the vehicle 13.

The at least one control circuit 160 may be operative to perform an ADAS function and/or autonomous driving function based on the received data, which is dependent on the lane-specific data determined by the processing system 20. The ADAS function and/or autonomous driving function may comprise an actuator control operation in which at least one vehicle actuator 161, 162 is controlled.

The at least one control circuit 160 may be operative to perform the at least one lane level traffic-based ADAS function and/or autonomous driving function based on both the data received via the interface 164 and sensor data captured using one or several onboard a vehicle sensors 165, 166. The vehicle sensor(s) may comprise a distance sensor 165 and/or at least one camera 166. For illustration, the at least one control circuit one 160 may be operative to combine lane-specific data received via the interface 164 with sensor data captured by the vehicle sensor(s) 165, 166 to generate a world model of the vehicle environment, which is then used to perform the at least one lane level traffic-based ADAS function and/or autonomous driving function.

Figure 13:
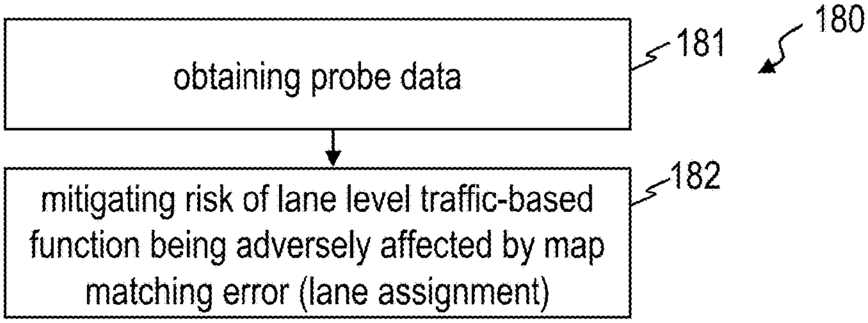
FIG. 13 is a flow chart of a method.

FIG. 13 is a flow chart of a method 180. The method 180 may be performed automatically by or using the processing system 20 or by a system 10 that comprises the processing system 20.

At process block 181, the processing system 20 receives the probe data 48 comprising GNSS-based position data. The GNSS-based position data may comprise GPS fixes and/or a GPS traces. The probe data may comprise data other than GNSS-based position data, such as probe speeds collected by a speed sensor different from the GNSS receiver of the probe. The processing system 20 may be operative to receive the probe data 48 from the probes via a communication system that may comprise a WAN and/or a cellular communication system.

At process block 182, the processing system 20 and/or the system 10 mitigates the risk of a lane level traffic-based function being adversely affected by an MME in a probe lane assignment. Process block 182 may comprise using the processing system 20, the system 10, or the method according to any aspect or embodiment disclosed herein to enhance the safety of intended functionality of a lane level traffic-based function, comprising performing a probe speed clustering to reduce the risk of incorrect probe lane assignment by the processing system 20, the system 10, or the method according to any aspect or embodiment disclosed herein.

Thus, techniques disclosed herein may be operative such that lateral probe positions and probe speeds are checked for correlation (e.g., linear correlation). If the correlation is significantly high (e.g., Pearson's correlation coefficient above some threshold), probes are clustered by speed. In the clustering, the number of clusters need not be predetermined. A cluster separation measure can be applied to determine an optimal number of clusters (i.e., the sets if vehicles share a set of lanes). Finally the clusters can be allocated to lanes. This may involve using average MME and standard deviation of the MMEs of each cluster.

While embodiments have been described with reference to the drawings, modifications and alterations may be implemented in other embodiments. While exemplary use cases in which the methods and vehicle processing system can be applied have been described in detail, the techniques disclosed herein may be used in association with a variety of additional scenarios.

For illustration, while embodiments have been described in which the processing system 20 is operative to use probe data from a plurality of probes 12, the probes 12 and processing system 20 may be operative for bidirectional communication, with the probes 12 utilizing the output provided by the processing system 20 to perform the at least one lane level traffic-based function.

For further illustration, the processing system and methods may be operative to restrict application of the probe data processing disclosed herein to segments on which lane-dependent effects on probe speed dominate over short-scale temporal variations of probe speed. The latter scenario may exist in proximity to a traffic light and/or a junction, where probe speeds are affected more by traffic light state and/or traffic flow at the roads connected to the junction, rather than by choice of lane. Thus, the processing system 20 and methods disclosed herein may be operative to determine, for a segment of the navigable network 91 and based on the electronic map data 24, whether a traffic light is arranged at the segment and/or whether the segment ends at a junction (in which case temporal variations of probe speed may be more dominant than lane-dependent effects), and performing the probe speed clustering techniques disclosed herein selectively responsive to verifying that no traffic light is arranged at the segment and the segment does not end at a junction.

This description and the accompanying drawings that illustrate aspects and embodiments of the present invention should not be taken as limiting-the claims defining the protected invention. In other words, while the invention has been illustrated and described in detail in the drawings and foregoing description, such illustration and description are to be considered illustrative and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figures individually although they may not have been described in the afore or following description. Also, single alternatives of the embodiments described in the Figures and the description and single alternatives of features thereof can be disclaimed from the subject matter of the invention or from disclosed subject matter. The disclosure comprises subject matter consisting of the features defined in the claims or the embodiments as well as subject matter comprising said features.

The term "comprising" does not exclude other elements or process blocks, and the indefinite article "a" or "an" does not exclude a plurality. A single unit or process block may fulfil the functions of several features recited in the claims. The mere fact that certain measures are recited in mutually different dependent claims does not indicate that a combination of these measures cannot be used to advantage. Components described as coupled or connected may be electrically or mechanically directly coupled, or they may be indirectly coupled via one or more intermediate components. Any reference signs in the claims should not be construed as limiting the scope.

A machine-readable instruction code may be stored/distributed on a suitable medium, such as an optical storage medium or a solid-state medium supplied together with or as part of other hardware, but may also be distributed in other forms, such as via a wide area network or other wired or wireless telecommunication systems. Furthermore, a machine-readable instruction code can also be a data structure product or a signal for embodying a specific method such as the method according to embodiments.

The invention claimed is:

1. A method of processing probe data for performance of at least one lane level traffic-based function, the method comprising:

receiving, by a processing system, the probe data from a plurality of probes travelling on a navigable network, wherein the probe data comprises global navigation satellite system, GNSS, -based position data;

processing, by the processing system, the probe data, the processing comprising:

determining, for a segment of the navigable network identified based at least on the GNSS-based position data, lane-specific data based at least on the probe data from probes on the segment, the determining comprising:

obtaining probe speeds for the probes on the segment based on the probe data from the probes on the segment, clustering the probe speeds into clusters based on lateral probe positions of the probes;

verifying that the clusters are distinguishable by determining a correlation measure between a lateral probe position and a probe speed of the probes on the segment and comparing the correlation measure to a threshold, and determining one or more lane-specific speed characteristics based at least on a cluster of the probe speeds responsive to verifying that the clusters are distinguishable; and providing or using the lane-specific data for the performance of the at least one lane level traffic-based function.

2. The method of claim 1, wherein the one or more lane-specific speed characteristics are determined independently of lane count information of electronic map data.

3. The method of claim 2, wherein the clustering is performed independently of the lane count information.

4. The method of claim 1, wherein the one or more lane-specific speed characteristics are determined independently of a lateral offset of the probes on the segment in a direction transverse to an extension direction of the segment.

5. The method of claim 1, wherein determining the one or more lane-specific speed characteristics comprises determining a number of the clusters of probe speeds in the clustering.

6. The method of claim 1, wherein determining the one or more lane-specific speed characteristics comprises determining a mean, median or average speed or an uncertainty measure for a cluster of the clusters of probe speeds.

7. The method of claim 1, wherein providing or using the lane-specific data comprises:

correcting an error in an GNSS position-based lane assignment based at least on the one or more lane-specific speed characteristics; and generating output based at least on the one or more lane-specific speed characteristics, the output enabling an error in an GNSS position-based lane assignment to be corrected, wherein the GNSS position-based lane assignment assigns the GNSS-based position data to a lane of the segment, wherein the GNSS position-based lane assignment comprises a map matching.

8. The method of claim 1, further comprising performing a lane assignment based at least on the GNSS-based position data and the lane-specific data.

9. The method of claim 8, wherein the at least one lane level traffic-based function is performed based at least on the lane assignment.

10. The method of claim 1, further comprising identifying, based at least on the one or more lane-specific speed characteristics, a discrepancy of an arrangement of lanes in the navigable network and electronic map data.

11. The method of claim 1, wherein determining the one or more lane-specific speed characteristics comprises distinguishing lane-dependent variations and temporal variations of the probe speeds on the segment.

12. The method of claim 1, wherein the at least one lane level traffic-based function comprises at least one of:

route search or route guidance;

route search or route guidance performed based at least on the lane-specific data for a segment that has physical barriers between lanes assigned to a same driving direction;

identification of incorrect lane data in an electronic map;

identification of maintenance work;

traffic flow control; and deployment of map updates.

13. A non-transitory computer-readable medium storing instructions which, when executed by a processing system, cause the processing system to process probe data for performance of at least one lane level traffic-based function, the method comprising:

receiving, by a processing system, the probe data from a plurality of probes travelling on a navigable network, wherein the probe data comprises global navigation satellite system, GNSS-based position data;

processing, by the processing system, the probe data, the processing comprising:

determining, for a segment of the navigable network identified based at least on the GNSS-based position data, lane-specific data based at least on the probe data from probes on the segment, comprising:

obtaining probe speeds for the probes on the segment based on the probe data from the probes on the segment, clustering the probe speeds into clusters based on lateral probe positions of the probes;

verifying that the clusters are distinguishable by determining a correlation measure between a lateral probe position and a probe speed of the probes on the segment and comparing the correlation measure to a threshold, and determining one or more lane-specific speed characteristics based at least on a cluster of the probe speeds responsive to verifying that the clusters are distinguishable; and providing or using the lane-specific data for the performance of the at least one lane level traffic-based function.

14. The non-transitory computer-readable medium of claim 13, wherein the one or more lane-specific speed characteristics are determined independently of lane count information of electronic map data.

15. The non-transitory computer-readable medium of claim 14, wherein the clustering is performed independently of the lane count information.

16. The non-transitory computer-readable medium of claim 13, wherein the one or more lane-specific speed characteristics are determined independently of a lateral offset of the probes on the segment in a direction transverse to an extension direction of the segment.

17. A processing system for processing probe data for performance of at least one lane level traffic-based function, the processing system comprising:

at least one interface operative to receive the probe data from a plurality of probes travelling on a navigable network, wherein the probe data comprises global navigation satellite system, GNSS, -based position data;

at least one processing circuit operative to:

determine, for a segment of the navigable network identified based at least on the GNSS-based position data, lane-specific data based at least on the probe data from probes on the segment, the at least one processing circuit being operative to:

obtain probe speeds for the probes on the segment based on the probe data from the probes on the segment, cluster the probe speeds into clusters based on lateral probe positions of the probes;

verify that the clusters are distinguishable by determining a correlation measure between a lateral probe position and a probe speed of the probes on the segment and comparing the correlation measure to a threshold, and determine one or more lane-specific speed characteristics based at least on a cluster of the probe speeds responsive to verifying that the clusters are distinguishable; and provide or use the lane-specific data for the performance of the at least one lane level traffic-based function.

18. The processing system of claim 17, wherein the one or more lane-specific speed characteristics are determined independently of lane count information of electronic map data.

19. The processing system of claim 18, wherein the clustering is performed independently of the lane count information.

20. A system, comprising:

a processing system, comprising:

at least one interface operative to receive the probe data from a plurality of probes travelling on a navigable network, wherein the probe data comprises global navigation satellite system, GNSS, -based position data;

at least one processing circuit operative to:

determine, for a segment of the navigable network identified based at least on the GNSS-based position data, lane-specific data based at least on the probe data from probes on the segment, the at least one processing circuit being operative to:

obtain probe speeds for the probes on the segment based on the probe data from the probes on the segment, cluster the probe speeds into clusters based on lateral probe positions of the probes;

verify that the clusters are distinguishable by determining a correlation measure between a lateral probe position and a probe speed of the probes on the segment and comparing the correlation measure to a threshold, and determine one or more lane-specific speed characteristics based at least on a cluster of the probe speeds responsive to verifying that the clusters are distinguishable; and provide or use the lane-specific data for the performance of at least one lane level traffic-based function; and at least one device operative to receive the lane-specific data and perform the at least one lane level traffic-based function based at least one the received lane-specific data.

* * * * *